(12) United States Patent
Ho

(10) Patent No.: US 8,479,223 B1
(45) Date of Patent: Jul. 2, 2013

(54) CONTROL METHOD OF SPINDLE MOTOR

(71) Applicant: Philips & Lite-On Digital Solutions Corporation, Taipei (TW)

(72) Inventor: Chun-Lung Ho, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 13/625,093

(22) Filed: Sep. 24, 2012

(30) Foreign Application Priority Data

May 17, 2012 (CN) .......................... 2012 1 0153924

(51) Int. Cl.
*G11B 33/02* (2006.01)
(52) U.S. Cl.
USPC ........................................ 720/602

(58) Field of Classification Search
USPC ................. 720/601, 602, 603, 610, 604, 649, 720/697, 646, 613, 606
See application file for complete search history.

(56) References Cited

U.S. PATENT DOCUMENTS

| | | | | |
|---|---|---|---|---|
| 5,526,328 | A * | 6/1996 | Oshima et al. | 369/13.02 |
| 6,005,833 | A * | 12/1999 | Yasuma et al. | 720/602 |
| 7,576,946 | B2 * | 8/2009 | Fujisawa | 360/99.06 |
| 2005/0259533 | A1 * | 11/2005 | Sakagami | 369/47.1 |

* cited by examiner

*Primary Examiner* — Allen T Cao
(74) *Attorney, Agent, or Firm* — McClure, Qualey & Rodack, LLP

(57) ABSTRACT

A control method for a spindle motor in disk drive including a tray for carrying a disk, a detect switch movable to different inclined positions for detecting different positions of the tray during tray ejection and retraction operation, a firmware for receiving signals transmitted by the detect switch upon reaching the different inclined positions so as to start up the spindle motor in advance.

9 Claims, 10 Drawing Sheets

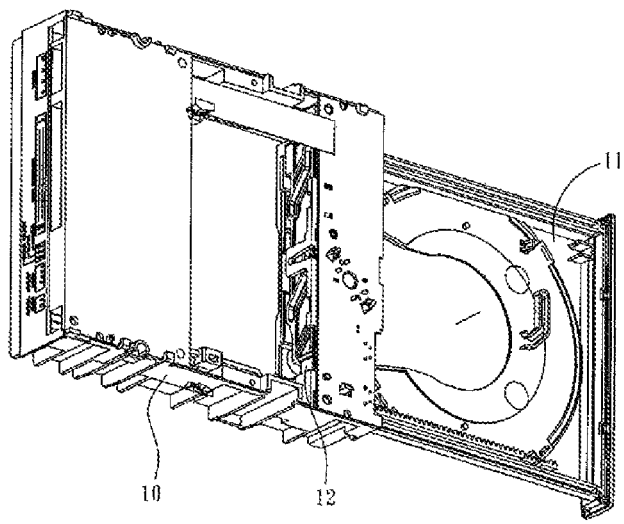
F I G . 1

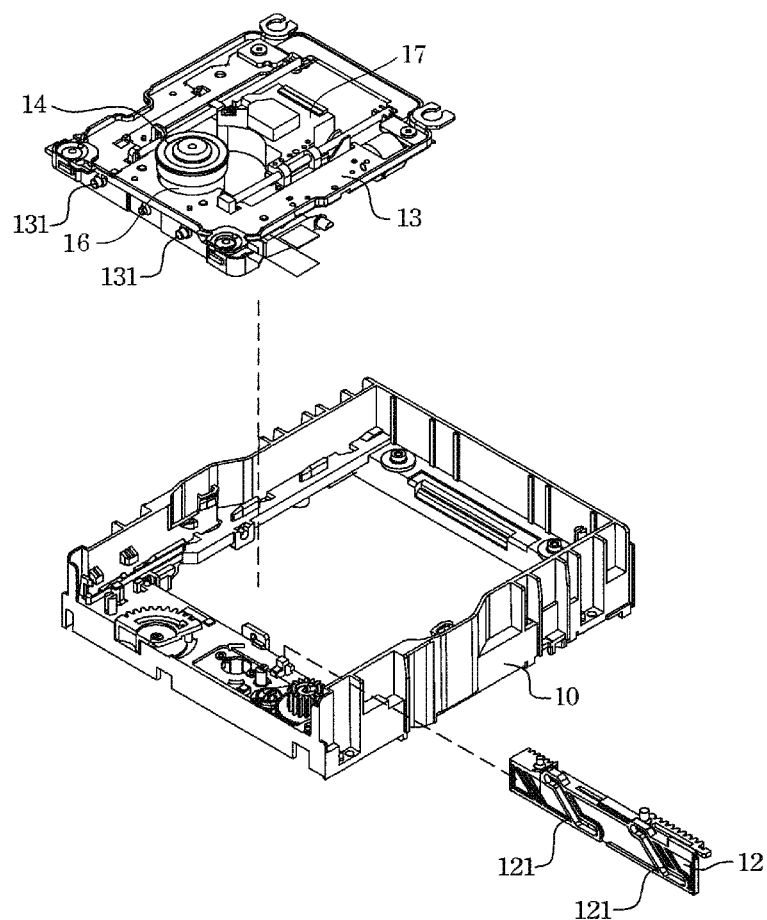
F I G . 2

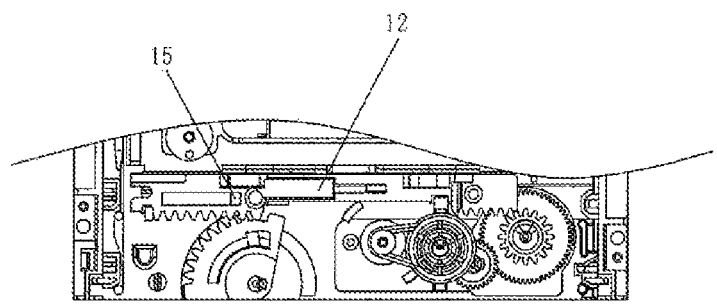
F I G . 3

CONTROL METHOD OF SPINDLE MOTOR

BACKGROUND OF THE INVENTION

1. Field of the Invention

The invention relates to a control method of spindle motor, and more particularly to a method for starting up the spindle motor in advance.

2. Description of the Related Art

Lately, as the electronic technology advances, optical disks are welcome more and more due to its compact size, high storage capacity and long preserving time for data. Prevalence of the optical disks raises the disk drive to a high demand commodity in the electronic market.

Referring to FIGS. 1 and 2, the disk drive comprises a casing 10 and a tray 11. A spindle motor 16 is disposed in the casing 10. A turntable 14 is disposed on the spindle motor 16 for clamping the disk with a clamper disposed on an upper cover. An optical pickup head 17 is disposed on two guide rods and slidable on the guide rods to read/write data on the disk. When the optical disk is loaded into the disk drive on the tray, it is clamped by the turntable 14 and the clamper. The spindle motor 16 rotates the turntable 14 and the disk so that the optical pickup head 17 is able to read/write data on the disk.

Generally, a firmware is used to judge whether a disk is on the tray 11 and the disk type of the loaded disk. The disk type can be, for example, DVD, CD, rewritable or read only. After the disk type is determined, suitable operating parameters are supplied to the optical pickup head 17 to read/write data on the disk. The firmware supplies a signal to drive/start up the spindle motor after the disk type is determined.

Generally, the spindle motor uses the magnet formed by rare earths materials. The magnet formed by rare earths materials generates stronger magnetic fields than other type magnets such as ferrite or plastic magnets. As a result, the spindle motor using the magnet formed by rare earths materials has a better increasing/decreasing speed performance.

However, production of rare earths materials is reducing and the cost is getting higher. The other type magnets (ferrite or plastic magnets) are also used in the spindle motor of disk drive. Due to the not stronger magnetic fields, the spindle motor using the other type magnets has a lower speed performance than that using the rare earths materials magnet. So the spindle motor using the other type magnets needs longer time to reach the predetermined speed after starting up.

SUMMARY OF THE INVENTION

The object of the present invention is to provide a spindle motor control method, in which, a detect switch transmits a signal based on the position of the tray so as to control the firmware to determine the disk type and start up the spindle motor in advance. Therefore, before the tray is loaded to the fully retracted position, the drive has longer time to determine the disk type and drive the spindle motor to reach the predetermined speed.

The spindle motor control method of the present invention is implemented in a disk drive that includes a tray for carrying a disk, a detect switch, a DC motor, a spindle motor, a traverse module and a firmware.

A voltage is applied to the DC motor to move the tray in sequence through a fourth position, a third position, a second position to a first position meanwhile the detect switch is correspondingly shifted in sequence through a fourth inclined position, a third inclined position, a second inclined position to a first inclined position.

When the detect switch is shifted to the third inclined position, a first signal is transmitted to the firmware. When the detect switch is shifted to the second inclined position, a second signal is transmitted to the firmware. The spindle motor control method includes the following steps:

moving the tray from the fourth position to the third position, wherein the traverse module is disposed at a lower position;

receiving the first signal;

moving the tray from the third position to the second position, wherein the traverse module is raised from the lower position to an upper position;

receiving the second signal;

determining whether the disk is present on the tray or not; and starting up the spindle motor.

When the tray is moved from the second position to the first position, the traverse module is disposed at the upper position. In other words, the traverse module is retained at the upper position during movement of the tray from the second position to the first position.

According to another embodiment, after predetermined time of receiving the first signal, the firmware determines whether the disk is present on the tray or not and starts up the spindle motor.

BRIEF DESCRIPTION OF THE DRAWINGS

Other features and advantages of this invention will become more apparent in the following detailed description of the preferred embodiments of this invention, with reference to the accompanying drawings, in which:

FIG. 1 is a schematic view illustrating relationship among a tray, an up-down plate and other mechanism in a disk drive;

FIG. 2 is an exploded view illustrating an outer casing, a traverse module and an up-down plate in the disk drive;

FIG. 3 shows a top fragmentary view illustrating interior components of the disk drive;

DETAILED DESCRIPTIONS OF THE PREFERRED EMBODIMENTS

Figure 4A:
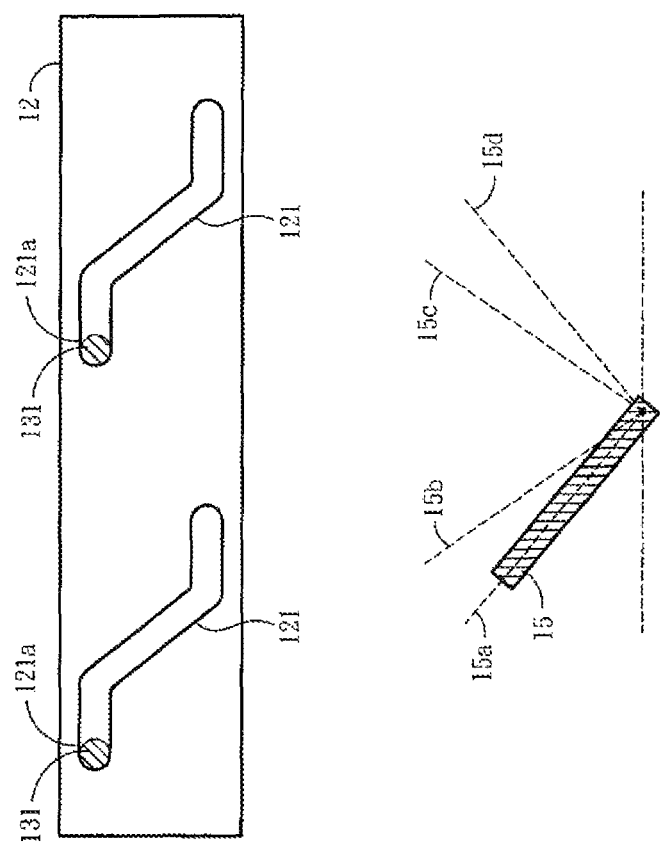
FIGS. 4A to 4D respectively shows relationship and positions among a traverse module, the up-down plate and a detect switch in a disk drive of the present invention.

FIGS. 1 to 2 respectively illustrates interior components of disk drives available in the market of today. FIG. 3 shows interior components within an outer casing of the disk drive.

As illustrated in FIG. 1, the disk drive generally includes a tray 11 for carrying a disk, an up-down plate 12 connected operationally to the tray 11 via rack-and-pinion mechanism (not shown) and a DC motor for driving the tray 11. Activation of the DC motor causes movements of the tray 11 to the retracted and ejected positions, which, in turn, results in reciprocal movement of the up-down plate 12 to left-and-right sides along a horizontal direction.

As shown in FIG. 2, the disk drive further includes an outer casing 10 receiving a traverse module 13 and the up-down plate 12, wherein the up-down plate is mounted in front of the traverse module 13. The traverse module 13 has a spindle motor 16, a turntable 14 and an optical pickup head 17. The spindle motor 16 uses the non-rare-earths-material magnet, for example, ferrite or plastic magnets.

The traverse module 13 has two guide rods 131 extending respectively and being slid into two Z-shaped sliding channels 121 in the up-down plate 12. Movement of the up-down plate 12 along the horizontal direction results in sliding action of the guide rods 131 in the Z-shaped sliding channels 121, thereby raising or lowering the traverse module 13 to upper or lower positions.

When the traverse module 13 is raised to the upper position, a turntable 14 located above the traverse module 13 retains the disk (not shown) stably thereon. The disk drive further includes a clamper opposite to the turntable 14, wherein the disk is retained stably between the turntable 14 and the clamper. Since the turntable 14 and the clamper both have magnetic members, a magnetic attraction is present therebetween to retain the disk more stably.

FIG. 3 shows a top fragmentary view of the disk drive of the present invention, wherein the disk drive further includes a detect switch 15 connected operationally to the tray 11 via a linkage mechanism so that the detect switch 15 is shifted to different inclined positions to detect relative positions of the tray during the tray retraction operation and tray ejection operation.

FIGS. 4A to 4D respectively shows relative positions of the guide rods 131 of the traverse module 13 within the Z-shaped sliding channels 121 in the up-down plate 12 during the tray ejection operation and the tray retraction operation and corresponding inclined positions of the detect switch 15.

FIG. 4A illustrates relative position of the corresponding mechanism when the tray 11 is at a first position (fully retracted position). When the tray 11 is moved to the first position, the guide rods 131 of the traverse module 13 are located at the leftmost side 121a of the upper straight section of the Z-shaped sliding channels 121 in the up-down plate 12. At this time, the traverse module 13 is retained at an upper position while the detect switch 15 is shifted to a first inclined position 15a. The first position indicates that the tray 11 is retracted fully within the disk drive.

Figure 4B:
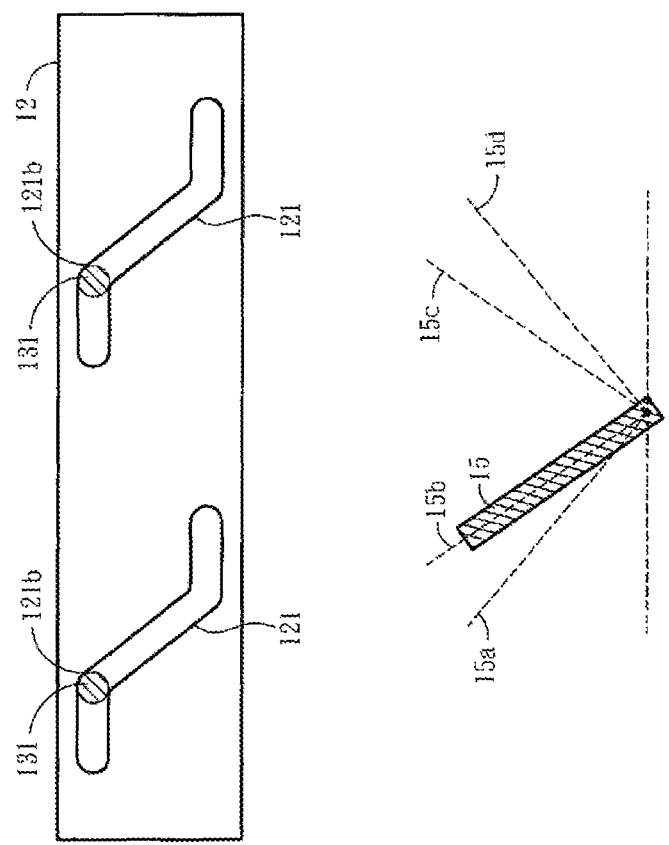

Referring to FIG. 4B, when the tray 11 is moved to a second position from the first position during the tray ejection operation, the up-down plate 12 moves to the left side of the casing along the horizontal direction, thereby moving the guide rods 131 of the traverse module 13 to the rightmost side 121b of the upper straight section of the Z-shaped sliding channels 121 in the up-down plate 12. At this time, the traverse module 13 is retained at the upper position while the detect switch 15 is shifted from the first inclined position 15a to a second inclined position 15b. The second position is close to the fully retracted position.

Figure 4C:
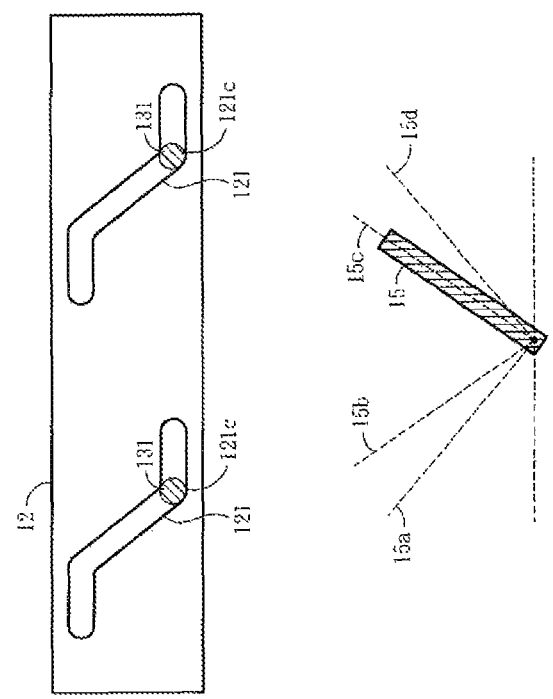

Referring to FIG. 4C, when the tray 11 is moved to a third position from the second position during the tray ejection operation, the up-down plate 12 moves further to the left side, thereby pushing the guide rods 131 of the traverse module 13 from the rightmost side 121b of the upper straight section of the Z-shaped sliding channels 121 downward along the inclined section of the Z-shaped sliding channels 121 to the leftmost side 121c of the lower straight section of the Z-shaped sliding channels 121. At this time, the traverse module 13 is consequently moved from the upper position to a lower position while the detect switch 15 is shifted from the second inclined position 15b to a third inclined position 15c. The third position is close to the fully ejected position.

Figure 4D:
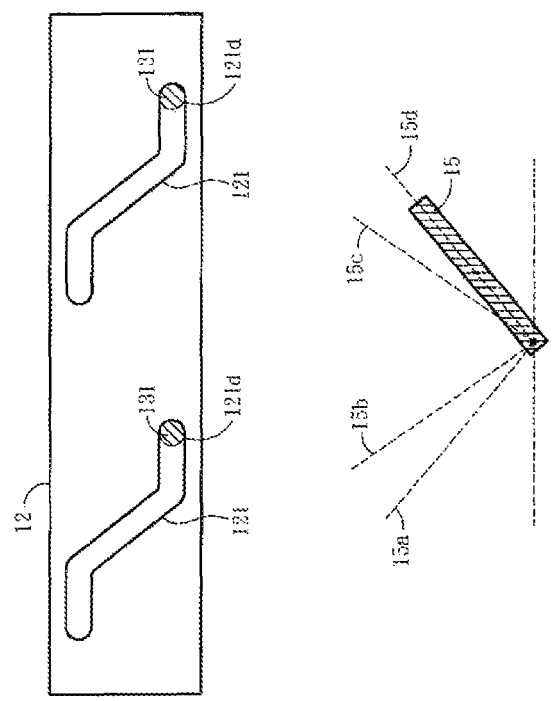

Referring to FIG. 4D, when the tray 11 is further moved to a fourth position during the tray ejection operation, the up-down plate 12 moves further to the left side along the horizontal direction, thereby moving the guide rods 131 from the leftmost side 121c of the lower straight section of the Z-shaped sliding channels 121 to the rightmost side 121d of the lower straight section. At this time, the traverse module 13 is retained at the lower position while the detect switch 15 is shifted from the third inclined position 15c to a fourth inclined position 15d. The fourth position indicates that the tray 11 is ejected fully outward from the disk drive while the third position is close to the fourth position.

The aforementioned FIGS. 4A to 4D respectively shows the steps, structural connection and relative positions among the traverse module 13, the up-down plate 12 and the detect switch 15 during the tray ejection operation of the disk drive. In the same manner, FIGS. 4D to 4A respectively shows the steps, structural connection and relative positions among the traverse module 13, the up-down plate 12 and the detect switch 15 during the tray retraction operation of the disk drive.

For tray ejection operation, during shifting the detect switch 15 from the first inclined position 15a to the second inclined position 15b, the detect switch 15 is maintained at the switch-on state. A first signal is transmitted to the firmware when the detect switch 15 is disposed at the second inclined position 15b. The first signal is a switch-off signal. During shifting the detect switch 15 from the second inclined position 15b to the third inclined position 15c, the detect switch 15 is maintained at the switch-off state. A second signal is transmitted to the firmware when the detect switch 15 is disposed at the third inclined position 15c. The second signal is the switch-on signal. During shifting the detect switch 15 from the third inclined position 15c to the fourth inclined position 15d, the detect switch 15 is maintained at the switch-on state.

In the same manner, for tray retraction operation, during shifting the detect switch 15 from the fourth inclined position 15d to the third inclined position 15c, the detect switch 15 is maintained at the switch-on state. A third signal is transmitted to the firmware when the detect switch 15 is disposed at the third inclined position 15c. The third signal is a switch-off signal. During shifting the detect switch 15 from the third inclined position 15c to the second inclined position 15b, the detect switch 15 is maintained at the switch-off state. A fourth signal is transmitted to the firmware when the detect switch 15 is disposed at the second inclined position 15b. The fourth signal is the switch-on signal. During shifting the detect switch 15 from the second inclined position 15b to the first inclined position 15a, the detect switch 15 is maintained at the switch-on state.

During the movements of the aforesaid tray 11, transmitting the signals by the detect switch 15 at different inclined positions and movements of the guide rods 131 within the Z-shaped sliding channels 121 in the up-down plate 12 are applied to control the firmware. Thus, the disk type determination and starting up the spindle motor can be performed in advance such that the spindle motor has more time to increase the rotating speed. A detailed disclosure thereof is given in the following paragraphs.

Summarizing the aforesaid movements of the hardware, for tray ejection operation, the DC motor is applied by a voltage to move the tray in sequence through the first position, the second position, the third position to the fourth position meanwhile the detect switch 15 is correspondingly shifted in sequence through the first inclined position 15a, the second inclined position 15b, the third inclined position 15c to the fourth inclined position 15d.

When the detect switch 15 is shifted from the first inclined position 15a to the second inclined position 15b, a first signal is transmitted to the firmware. When the detect switch 15 is shifted from the second inclined position 15b to the third inclined position 15c, a second signal is transmitted to the firmware, wherein the first signal is a switch-off signal while the second signal is a switch-on signal.

Figure 5:
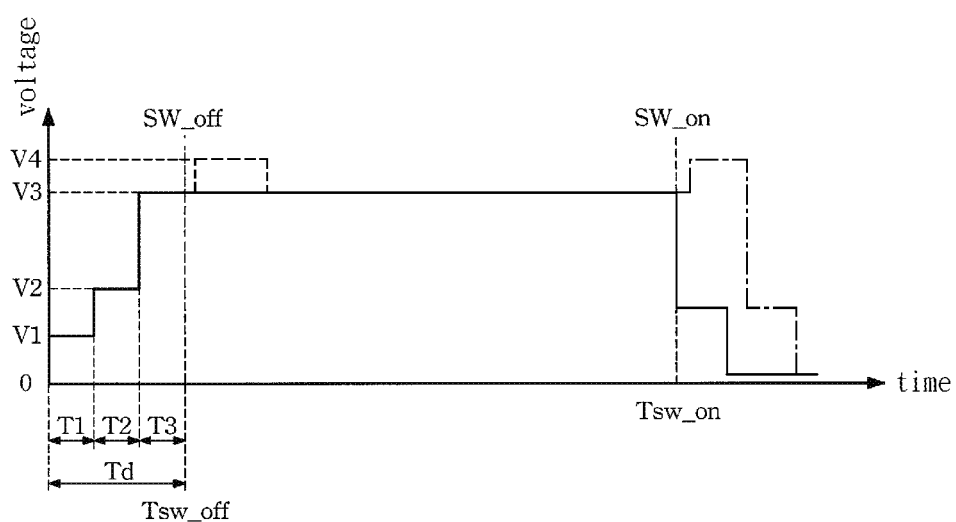
FIG. 5 is a graph representing the voltage applied to a DC motor and the application time during the tray retraction operation in the disk drive of the present invention.
Figure 6:
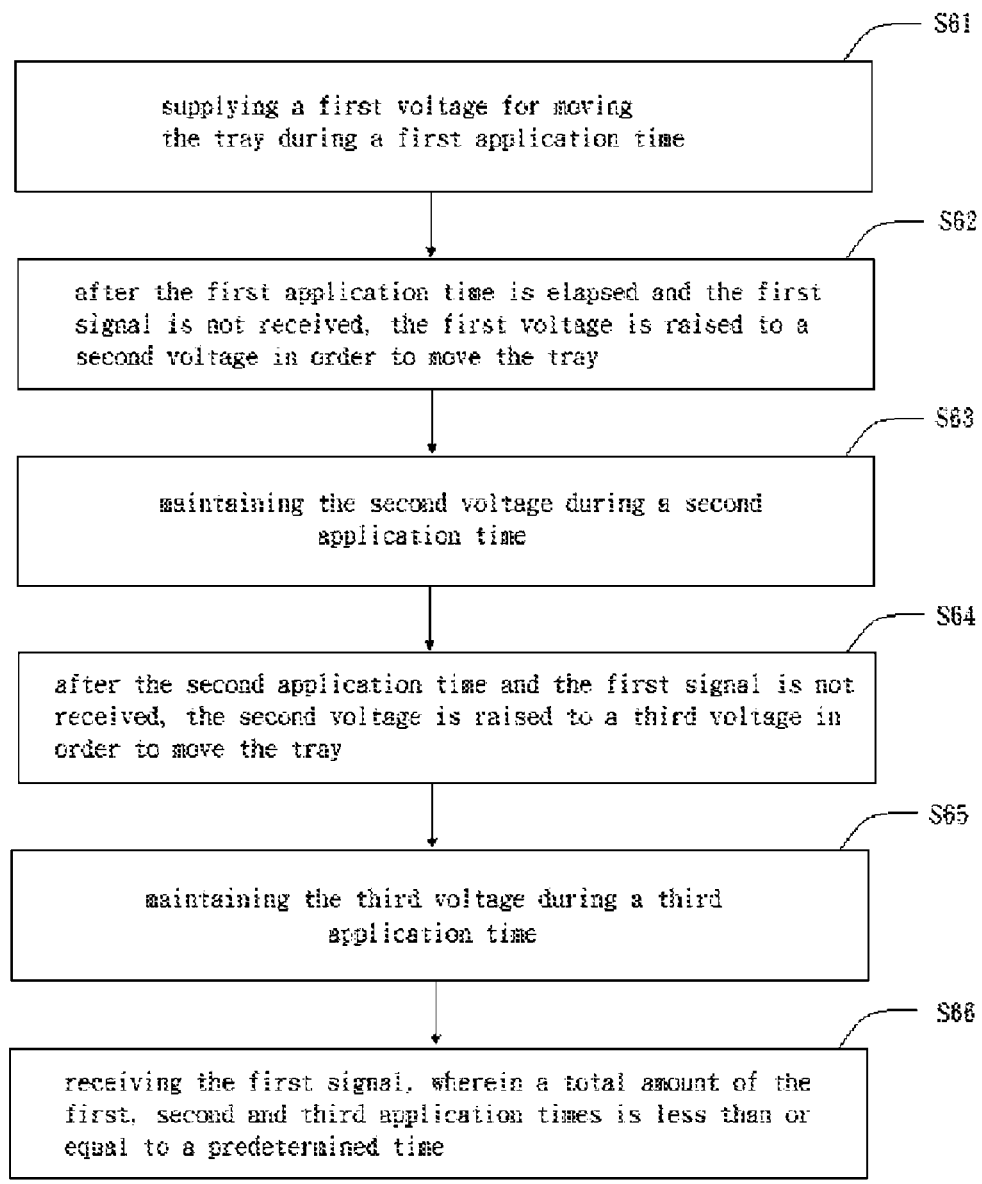
FIG. 6 is a block diagram illustrating the control steps during initial stage of a tray retraction operation in the disk drive of the present invention.

Referring to FIGS. 5 and 6, the method for controlling the voltage level and the application time during the initial stage of the tray retraction operation, includes the following steps.

First, supply a first voltage V1 for moving the tray 11 during a first application time T1 (S61), wherein the tray 11 is moved from the fourth position (fully ejected position) to the third position.

After the first application time T1 is elapsed and the first signal is not received, raise the first voltage V1 to a second voltage V2 in order to move the tray 11 (S62). It means that since the components of the disk drive are in tight structural connection, the first voltage V1 applied during the first application time T1 is unable to move the tray 11 to the third position. A larger voltage is required so that the firmware raises the first voltage V1 to the second voltage V2 to move the tray 11.

In this step, the firmware alters the first voltage V1 to the second voltage V2.

Then, maintain the second voltage V2 during a second application time T2 (S63).

After the second application time T2 is elapsed, and the first signal is still not received, raise the second voltage V2 to a third voltage V3 in order to move the tray 11 (S64). During the second application time T2, the second voltage V2 is unable to move the tray 11 to the third position means that the mechanism of the disk drive are in tight structural connection. Avoiding the tray retraction operation is too slowly, a larger voltage is required to move the tray 11. In this step, the firmware alters the second voltage V2 to the third voltage V3.

Maintain the third voltage V3 during a third application time T3 (S65).

Later, receive the first signal, wherein a total amount of the first, second and third application times is less than or equal to a predetermined time Td (S66). During this step, the tray 11 is moved to the third position while the detect switch 15 is consequently shifted to the third inclined position 15c and transmits the first signal to the firmware.

Since the structural connection among the components in one disk drive differs from the other disk drive, in other embodiment, maybe only the second voltage V2 is required to move the tray 11 to the third position during the predetermined time Td. Or a fourth voltage V4 (dotted line) is required to move the tray 11 to the third position and then moves the tray 11 by third voltage V3 to the second position after the tray 11 is arrived at third position.

When the detect switch 15 is shifted from the third inclined position 15c to the second inclined position 15b, a second signal is transmitted to the firmware. Then a small voltage is supplied to move the tray 11 to the first position.

Therefore, in the aforesaid method, during movements of the tray 11 from the fourth position to the first position, the voltage and the application time are adjusted in order to compensate the tight and loose structural connection among the components, thereby controlling the tray retraction time within the predetermined time. Thus, the tray retraction time does not take too long.

Figure 7:
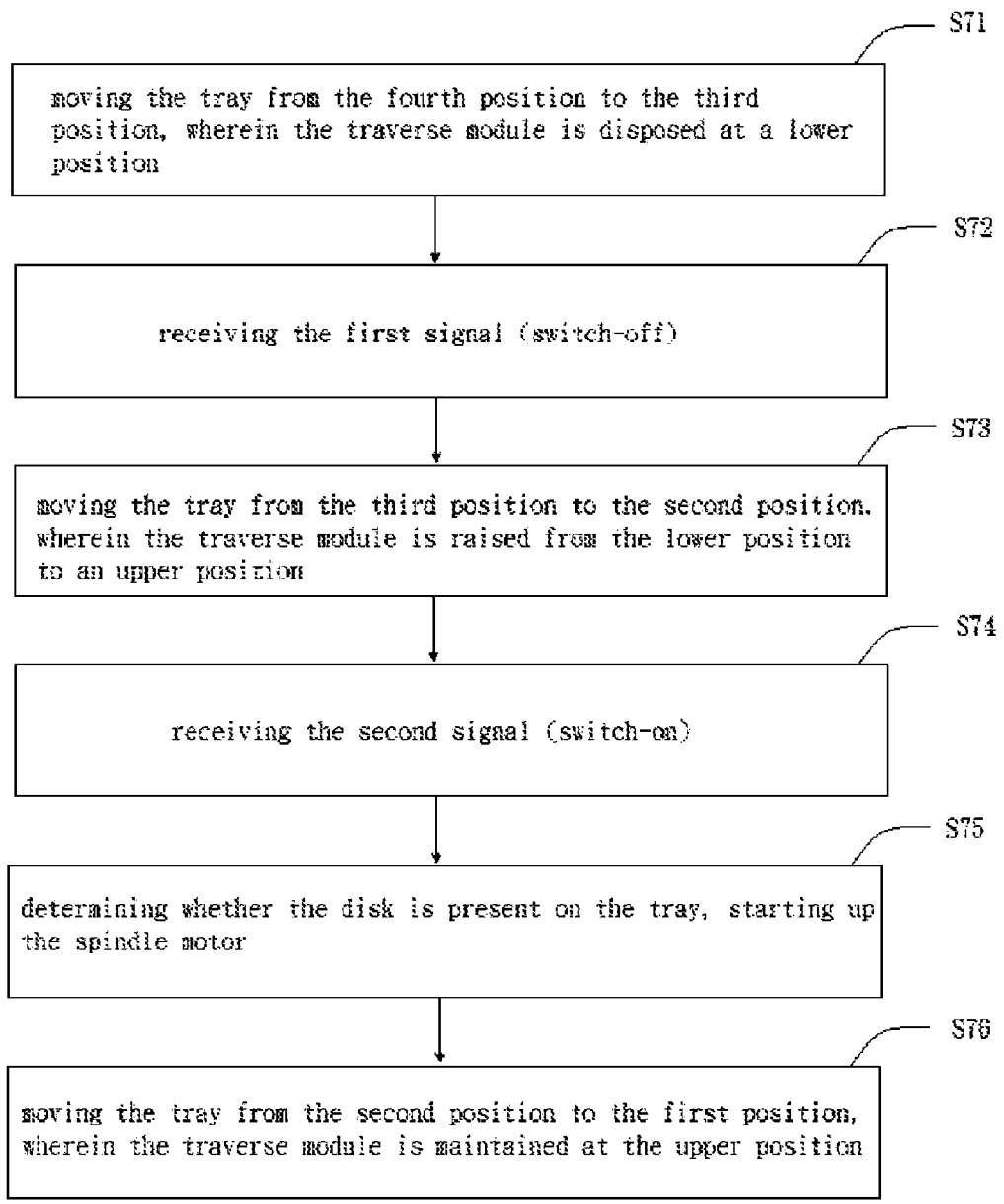
FIG. 7 is a block diagram illustrating the steps for controlling the disk type determination and starting up the spindle motor in advance.

FIG. 7 is a block diagram illustrating the steps for a control method of the present invention during the tray retraction operation in the disk drive. For tray retraction operation, the DC motor is applied by a voltage to move the tray 11 in sequence through the fourth position, the third position, the second position to the first position meanwhile the detect switch 15 is correspondingly shifted in sequence through the fourth inclined position 15d, the third inclined position 15c, the second inclined position 15b to the first inclined position 15a.

When the detect switch 15 is shifted to the third inclined position 15c, a first signal is transmitted to the firmware. When the detect switch 15 is shifted to the second inclined position 15b, a second signal is transmitted to the firmware. During the tray retraction operation, the first signal is a switch-off signal while the second signal is a switch-on signal.

The tray retraction control method accordingly includes the following steps.

Move the tray 11 from the fourth position to the third position, wherein the traverse module 13 is disposed at a lower position (S71). In this step and during movement of the tray 11 from the fourth position to the third position, the up-down plate 12 moves along a horizontal direction to the right side of the outer casing 10, in which the guide rods 131 are moved from the rightmost side 121d to the leftmost side 121c in the lower straight section of the Z-shaped guiding channels 121 in the up-down plate 12. The traverse module 13 is maintained at the lower position.

Receive the first signal (S72). In this step, when the tray 11 is moved to the third position, the detect switch 15 is correspondingly shifted to the third inclined position 15c while the first signal is transmitted to the firmware.

Move the tray 11 from the third position to the second position, wherein the traverse module 13 is raised from the lower position to an upper position (S73). In this step, movement of the up-down plate 12 to the right side of the outer casing 10 results in raising the guide rods 131 from the leftmost side 121c to the rightmost side 121b of the inclined section of the Z-shaped guiding channels 121 in the up-down plate 12. At this time, the traverse module 13 is raised from the lower position to the upper position.

Receive the second signal (S74). In this step, the tray 11 is moved to the second position while the detect switch 15 is accordingly shifted to the second inclined position 15b. The second signal is transmitted to the firmware in the disk drive. Then, the firmware determines whether the disk is present on the tray 11 or not and starts up the spindle motor (S75). In this step, the firmware further finds out the type of disk and dimension of the disk when the disk is present on the tray 11. So that the firmware can make an early starting up of the spindle motor and determination of the disk with respect to the tray 11 prior to the tray 11 reaching the fully retracted position (the first position).

Afterward, move the tray 11 from the second position to the first position, wherein during movement of the tray 11 from the second position to the first position, the traverse module 13 is maintained at the upper position (S76).

In the aforesaid method, before the tray reaching the fully retracted position (first position), the firmware can make an early starting up of the spindle motor and determination of the disk.

When the spindle motor uses the ferrite or plastic magnets, by starting up the spindle motor before the tray is at the fully retracted position, the spindle motor has more time to increase the rotating speed to the predetermined speed.

According to another embodiment of present invention, when the firmware receives the first signal, the firmware waits a predetermined time and then starts up the spindle motor and determines the disk type. The predetermined time may be equal to or less than the time difference of receiving the first signal and second signal in the first embodiment. By this way, the firmware can start up the spindle motor and determine the disk type without receiving the second signal. Therefore, the spindle motor has more time to speed up to the predetermined speed.

According to above description, before the tray is at the fully retracted position, the disk type determination and the starting up of spindle motor are activated. So the drive has more time for determining the disk type and speeding up the spindle motor.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for controlling spindle motor of a disk drive that includes a tray for carrying a disk, a detect switch, a DC motor, a spindle motor, a traverse module and a firmware, wherein during tray retraction operation, a voltage is applied to the DC motor to move the tray in sequence through a first position, a second position, a third position to a fourth position meanwhile the detect switch is correspondingly shifted in sequence through a first inclined position, a second inclined position, a third inclined position to a fourth inclined position, wherein a first signal is transmitted to the firmware when the detect switch is shifted to the second inclined position, and a second signal is transmitted to the firmware when the detect switch is shifted to the third inclined position, the spindle motor control method comprising the following steps:

moving the tray from the fourth position to the third position, wherein the traverse module is disposed at a lower position;
    receiving the first signal;
    moving the tray from the third position to the second position, wherein the traverse module is raised from said lower position to an upper position;
    receiving the second signal;
    determining whether the disk is present on the tray or not;
    starting up the spindle motor; and
    moving the tray from the second position to the first position, wherein the traverse module is disposed at said upper position, the traverse module being retained at said upper position during movement of the tray from the second position to the first position.

2. The spindle motor control method according to claim 1, wherein during the tray retraction operation, said first signal is a switch-off signal while said second signal is a switch-on signal.

3. The spindle motor control method according to claim 1, wherein said first position indicates that the tray is retracted fully within the disk drive, said fourth position indicates that the tray is ejected fully outward from the disk drive while said third position is close to the fourth position and said second position is close to said first position.

4. The spindle motor control method according to claim 1, wherein the disk type is determined after receiving the second signal.

5. A method for controlling spindle motor of a disk drive that includes a tray for carrying a disk, a detect switch, a DC motor, a spindle motor, a traverse module and a firmware, wherein during tray retraction operation, a voltage is applied to the DC motor to move the tray in sequence through a first position, a second position, a third position to a fourth position meanwhile the detect switch is correspondingly shifted in sequence through a first inclined position, a second inclined position, a third inclined position to a fourth inclined position, wherein a first signal is transmitted to the firmware when the detect switch is shifted to the second inclined position, and a second signal is transmitted to the firmware when the detect switch is shifted to the third inclined position, the spindle motor control method comprising the following steps:

moving the tray from the fourth position to the third position, wherein the traverse module is disposed at a lower position;
    receiving the first signal; and
    after receiving the first signal for a predetermined time, determining whether the disk is present on the tray or not, and starting up the spindle motor.

6. The spindle motor control method according to claim 5, wherein during the tray retraction operation, said first signal is a switch-off signal while said second signal is a switch-on signal.

7. The spindle motor control method according to claim 5, wherein said first position indicates that the tray is retracted fully within the disk drive, said fourth position indicates that the tray is ejected fully outward from the disk drive while said third position is close to the fourth position and said second position is close to said first position.

8. The spindle motor control method according to claim 5, wherein the disk type is determined after the disk is present on the tray.

9. The spindle motor control method according to claim 5, wherein the predetermined time is equal to or less than the time difference of receiving the first signal and second signal.

* * * * *